(12) United States Patent
Ikegami et al.

(10) Patent No.: US 10,014,499 B2
(45) Date of Patent: Jul. 3, 2018

(54) BATTERY PACK HOUSING STRUCTURE, AND ELECTRONIC EQUIPMENT

(71) Applicant: NEC PLATFORMS, LTD, Kawasaki-shi, Kanagawa (JP)

(72) Inventors: Yohei Ikegami, Kawasaki (JP); Akihisa Iwata, Kawasaki (JP); Takeshi Komatsu, Kawasaki (JP)

(73) Assignee: NEC PLATFORMS, LTD., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/524,027

(22) PCT Filed: Sep. 16, 2015

(86) PCT No.: PCT/JP2015/004713
§ 371 (c)(1),
(2) Date: May 3, 2017

(87) PCT Pub. No.: WO2016/075855
PCT Pub. Date: May 19, 2016

(65) Prior Publication Data
US 2017/0352848 A1    Dec. 7, 2017

(30) Foreign Application Priority Data
Nov. 14, 2014 (JP) .................. 2014-231331

(51) Int. Cl.
*H01M 2/10* (2006.01)

(52) U.S. Cl.
CPC ...... *H01M 2/1066* (2013.01); *H01M 2220/30* (2013.01)

(58) Field of Classification Search
None
See application file for complete search history.

(56) References Cited

U.S. PATENT DOCUMENTS

2006/0134513 A1* 6/2006 Tsumura ............. H01M 2/0207
                                                         429/100
2006/0240321 A1* 10/2006 Takeshita ........... H01M 2/0215
                                                         429/176
(Continued)

FOREIGN PATENT DOCUMENTS

CN           1893147 A     1/2007
CN         101036248 A     9/2007
(Continued)

OTHER PUBLICATIONS

International Search Report for PCT/JP2015/004713 dated Nov. 17, 2015.

(Continued)

*Primary Examiner* — Wojciech Haske
(74) *Attorney, Agent, or Firm* — Sughrue Mion, PLLC

(57) ABSTRACT

An electronic device and a battery pack housing structure capable of housing a battery pack without use of a contour width of the battery pack for positioning. The battery pack housing structure includes a battery-pack lower-surface protruding portion protruding from a lower surface of the battery pack and the housing portion including a housing-portion bottom-surface groove portion, which is formed in a bottom surface of the housing portion and capable of being fitted to the battery-pack lower-surface protruding portion.

6 Claims, 13 Drawing Sheets

(56) References Cited

U.S. PATENT DOCUMENTS

2013/0224539 A1     8/2013   Hayashi et al.
2014/0356665 A1    12/2014   Hayashi et al.

FOREIGN PATENT DOCUMENTS

| CN | 102856607 A | 1/2013 |
|----|-------------|--------|
| JP | 2006-086072 A | 3/2006 |
| JP | 2006-128007 A | 5/2006 |
| JP | 2009-163292 A | 7/2009 |
| JP | 4568086 B2 | 10/2010 |
| JP | 2012-054086 A | 3/2012 |
| JP | 2012-099383 A | 5/2012 |
| WO | 2012/060178 A1 | 5/2012 |

OTHER PUBLICATIONS

Communication dated Feb. 6, 2018, from State Intellectual Property Office of the P.R.C. in counterpart application No. 201580060588.2.

* cited by examiner

BATTERY PACK HOUSING STRUCTURE, AND ELECTRONIC EQUIPMENT

CROSS REFERENCE TO RELATED APPLICATIONS

This application is a National Stage of International Application No. PCT/JP2015/004713 filed Sep. 16, 2015, claiming priority based on Japanese Patent Application No. 2014-231331 filed Nov. 14, 2014, the contents of all of which are incorporated herein by reference in their entirety.

TECHNICAL FIELD

This invention relates to a battery pack housing structure and an electronic device.

BACKGROUND ART

An electronic device houses a battery pack in its housing portion in order to secure electric power needed for an operation.

In Patent Document 1, there is disclosed an electronic device which enables proper insertion of a battery pack while suppressing increase in size and weight of the device.

PRIOR ART DOCUMENTS

Patent Document

Patent Document 1: JP-A-2009-163292

DISCLOSURE OF THE INVENTION

Problem to be Solved by the Invention

When the electronic device and the battery pack are increased in size, dimensional tolerances thereof are also increased. Thus, a gap corresponding to the dimensional tolerances is formed between the battery pack and the housing portion for the battery pack of the electronic device. FIG. 12 is a view for illustrating a structure of a battery pack 10' according to a related art. FIG. 13 is a sectional view for illustrating a state in which the battery pack 10' is housed in a housing portion 110' of an electronic device. In FIG. 12 and FIG. 13, for easy understanding of description, directions are defined as follows. In the battery pack 10', a direction perpendicular to a side surface, on which a plurality of connection terminals for electrical connection are provided, is defined as an x direction. A direction orthogonal to the x direction is defined as a y direction. A direction orthogonal to the x direction and the y direction is defined as a z direction.

In FIG. 12, a battery-pack terminal positioning portion 15' is arranged with the plurality of connection terminals provided on the side surface of the battery pack 10'. A plurality of connection terminals to be connected to the plurality of connection terminals of the battery pack 10' are provided to the housing portion 110' of the electronic device, and a housing-portion terminal positioning portion 115' is provided to a position corresponding to the battery-pack terminal positioning portion 15'. In FIG. 12, for easy understanding, the battery pack 10' is illustrated with its lower surface oriented upward.

In FIG. 13, a length of the battery pack 10' in the y direction is denoted by A', and a dimensional tolerance thereof is denoted by ±B'. Further, a length of the housing portion 110' in they direction is denoted by C', and a dimensional tolerance thereof is denoted by ±D'. In the related art, the battery pack 10' is housed in the housing portion 110' through use of a dimension of the battery pack 10' itself in they direction (contour width) for positioning. In this case, as illustrated in FIG. 13, a gap resulting from a dimensional difference of (C'+D')-(A'-B') at maximum is formed. Here, as the battery pack 10' becomes larger, that is, as the dimensions A' and C' become larger, the dimensional tolerances B' and D' become larger proportionally. Therefore, the gap formed between the housing portion 110' and the battery pack 10' becomes larger in proportion to the dimensional tolerances. As a result, when the dimensional tolerances causing the gap exceed certain values, relative positions of the battery-pack terminal positioning portion 15' provided to the battery pack 10' and the housing-portion terminal positioning portion 115' provided to the housing portion 110' are shifted. Accordingly, there is a fear in that the dimension of the battery pack 10' itself in the y direction (contour width) cannot be used for positioning. When the dimension of the battery pack 10' itself in the y direction (contour width) cannot be used for positioning, it is necessary to perform an operation of positioning (registration) of the battery pack 10' so that the battery-pack terminal positioning portion 15' provided to the battery pack 10' and the housing-portion terminal positioning portion 115' provided to the housing portion 110' are fitted to each other.

However, in Patent Document 1, no consideration is given to the shift in relative positions of the connection terminals of the battery pack and the connection terminals of the housing portion.

This invention has been made in view of the above-mentioned circumstances, and an object of this invention is to provide an electronic device and a battery pack housing structure capable of housing a battery pack without use of a contour width of the battery pack for positioning.

Means to Solve the Problem

A battery pack housing structure according to this invention is used for an electronic device including a housing portion for housing a battery pack comprises the battery pack comprising a battery-pack lower-surface protruding portion protruding from a lower surface of the battery pack; and the housing portion comprising a housing-portion bottom-surface groove portion, which is formed in a bottom surface of the housing portion and capable of being fitted to the battery-pack lower-surface protruding portion, wherein, when the battery-pack lower-surface protruding portion and the housing-portion bottom-surface groove portion are fitted to each other, relative positions of connection terminals of the battery pack and connection terminals of the housing portion are set, and wherein the relative positions are positions in a terminal connection direction in which the connection terminals of the battery pack and the connection terminals of the housing portion are connected to each other.

An electronic device according to this invention which includes a housing portion for housing a battery pack comprises the battery pack comprising a battery-pack lower-surface protruding portion protruding from a lower surface of the battery pack, and the housing portion comprising a groove-like housing-portion bottom-surface groove portion, which is formed in a bottom surface of the housing portion and capable of being fitted to the battery-pack lower-surface protruding portion, wherein, when the battery-pack lower-surface protruding portion and the housing-portion bottom-surface groove portion are fitted to each other, relative positions of connection terminals of the battery pack and connection terminals of the housing portion are set, and wherein the relative positions are positions in a terminal connection direction in which the connection terminals of the battery pack and the connection terminals of the housing portion are connected to each other.

Effect of the Invention

According to this invention, it is possible to provide the electronic device and the battery pack housing structure capable of housing the battery pack without use of the contour width of the battery pack for positioning.

MODE FOR EMBODYING THE INVENTION

Figure 1:
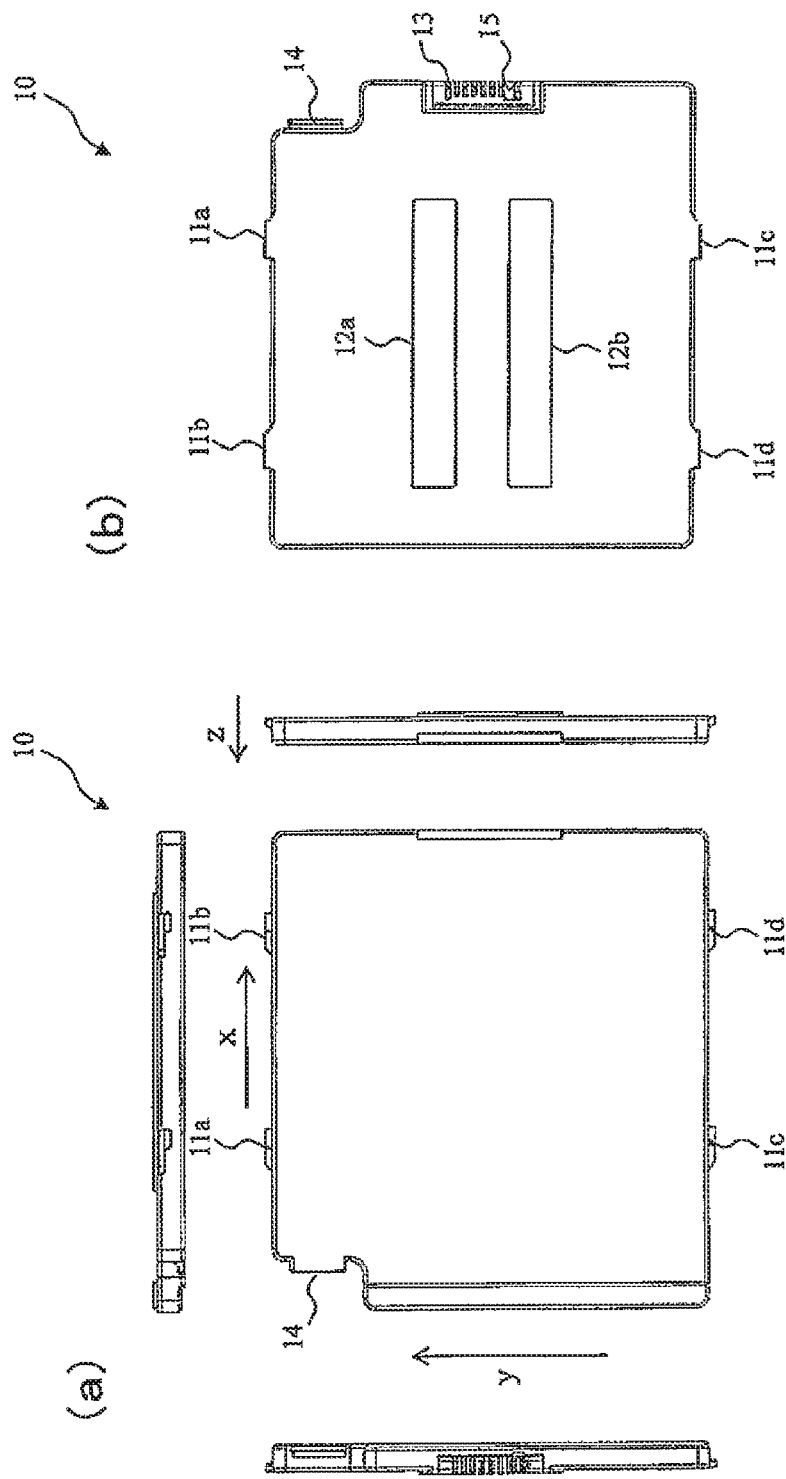
FIG. 1 includes views for illustrating a battery pack according to a first embodiment of this invention, in which part (a) is a view for illustrating structures of an upper surface and three side surfaces and part (b) is a view for illustrating a structure of a lower surface.

Now, embodiments of this invention are described in detail with reference to the drawings. Note that, similar descriptions are omitted as appropriate in order to avoid complications due to repetition.

1. First Embodiment

With reference to FIG. 1 to FIG. 4, description is made of structures of a battery pack 10, a housing portion 110 of an electronic device 100, and a battery cover 200 in a battery pack housing structure according to a first embodiment of this invention.

FIG. 1(a) is a plan view of the battery pack 10 as seen from its upper surface side and views as seen from its side surface sides. FIG. 1(b) is a view of the battery pack 10 as seen from its lower surface side. In FIG. 1(a), a horizontal direction, a vertical direction, and a thick direction of the battery pack 10 are hereinafter defined as an x direction, a y direction, and a z direction, respectively. In other words, in the battery pack 10, a direction perpendicular to a side surface, on which a plurality of battery-pack connection terminals 13 for electrical connection are provided, is defined as the x direction. A direction orthogonal to the x direction is defined as the y direction. A direction orthogonal to the x direction and the y direction is defined as the z direction. Further, directions indicated by the arrows of FIG. 1(a) are defined as + (plus) directions, and directions opposite to the arrows are defined as − (minus) directions. Thus, a +x (plus x) direction is a direction away from the side surface having the battery-pack connection terminals 13. A +z (plus z) direction is a direction from a lower surface toward an upper surface of the battery pack 10.

(1-1, Structure of Battery Pack)

With reference to FIG. 1(a) and FIG. 1(b), the battery pack 10 includes four battery-pack side-surface protruding portions 11a to 11d, two battery-pack lower-surface protruding portions 12a and 12b, the plurality of battery-pack connection terminals 13, a battery-pack claw portion 14, and a battery-pack terminal positioning portion 15. The battery-pack connection terminals 13 are achieved with receiving portions capable of receiving housing-portion connection terminals 113 provided in the housing portion 110, which are described later.

The battery-pack side-surface protruding portion 11a and the battery-pack side-surface protruding portion 11b are provided on one side surface of two side surfaces corresponding to the x direction, and are protruding portions each having an L shape protruding in a +y (plus y) direction. The battery-pack side-surface protruding portion 11c and the battery-pack side-surface protruding portion 11d are provided on another side surface of the two side surfaces corresponding to the x direction, and are protruding portions each having an L shape protruding in a −y (minus y) direction. The battery-pack side-surface protruding portion 11c is provided to a position opposite to the battery-pack side-surface protruding portion 11a. The battery-pack side-surface protruding portion 11d is provided to a position opposite to the battery-pack side-surface protruding portion 11b. The number and the shape of the protruding portions provided on the side surfaces of the battery pack 10 are not particularly limited to the above-mentioned example.

The battery-pack lower-surface protruding portion 12a and the battery-pack lower-surface protruding portion 12b are provided on the lower surface of the battery pack 10 so as to protrude in a −z (minus z) direction, and are protruding portions each having a quadrangular cross section in the vertical direction (short direction). A protruding portion having a quadrangular cross section, for example, may be a rectangular parallelepiped having long sides along the x direction and short sides along the y direction. Further, the battery-pack lower-surface protruding portion 12a and the battery-pack lower-surface protruding portion 12b extend in the x direction, and are provided in parallel with each other in the y direction. The number and the shape of the battery-pack lower-surface protruding portions are not particularly limited. For example, the battery-pack lower-surface protruding portions may be protruding portions each having a triangular or semicircular cross section in the vertical direction.

Each of the battery-pack connection terminals 13 is a terminal (socket) provided in the receiving portion formed on one side surface of two side surfaces corresponding to the y direction. The battery pack 10 is configured to supply electric power to the electronic device 100 via the plurality of battery-pack connection terminals 13.

The battery-pack claw portion 14 is provided to a position close to a corner of the same side surface as the side surface on which the battery-pack connection terminals 13 are provided. A user can take out the battery pack 10 from the housing portion 110 of the electronic device 100 by hooking fingers of the user or the like on the battery-pack claw portion 14 and applying a force in the +x (plus x) direction to disconnect the battery-pack connection terminals 13 from the housing-portion connection terminals 113.

The battery-pack terminal positioning portion 15 is provided so as to be adjacent to the battery-pack connection terminals 13, and is a positioning portion having a concave receiving structure. As is described later, the housing portion 110 of the electronic device 100 has a housing-portion terminal positioning portion at a position corresponding to the battery-pack terminal positioning portion 15. The housing-portion terminal positioning portion and the battery-pack terminal positioning portion 15 are fitted to each other. Accordingly, the battery-pack connection terminals 13 and the housing-portion connection terminals included in the housing portion 110 of the electronic device 100 can be connected to each other without hindrance.

(1-2. Structure of Housing Portion of Electronic Device)

Figure 2:
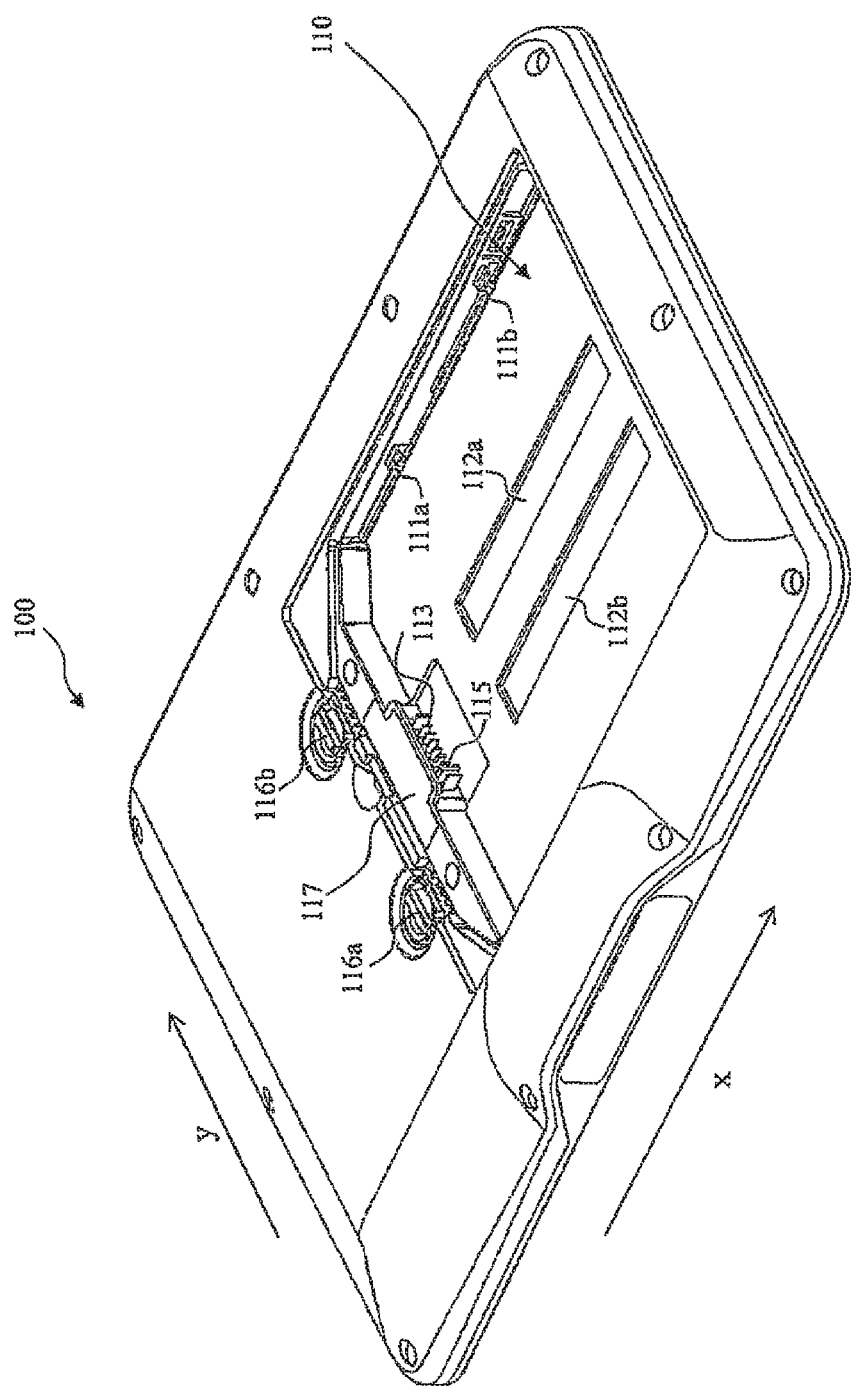
FIG. 2 is a perspective view for illustrating a structure of a housing portion for the battery pack of an electronic device according to the first embodiment.

Next, with reference to FIG. 2, description is made of a structure of the housing portion 110 of the electronic device 100.

With reference to FIG. 2, the housing portion 110 includes four housing-portion side-surface protruding portions 111a to 111d, two housing-portion bottom-surface groove portions 112a and 112b, the plurality of housing-portion connection terminals 113, a housing-portion terminal positioning portion 115, two fixtures 116a and 116b, and a terminal protection portion 117.

Figure 8:
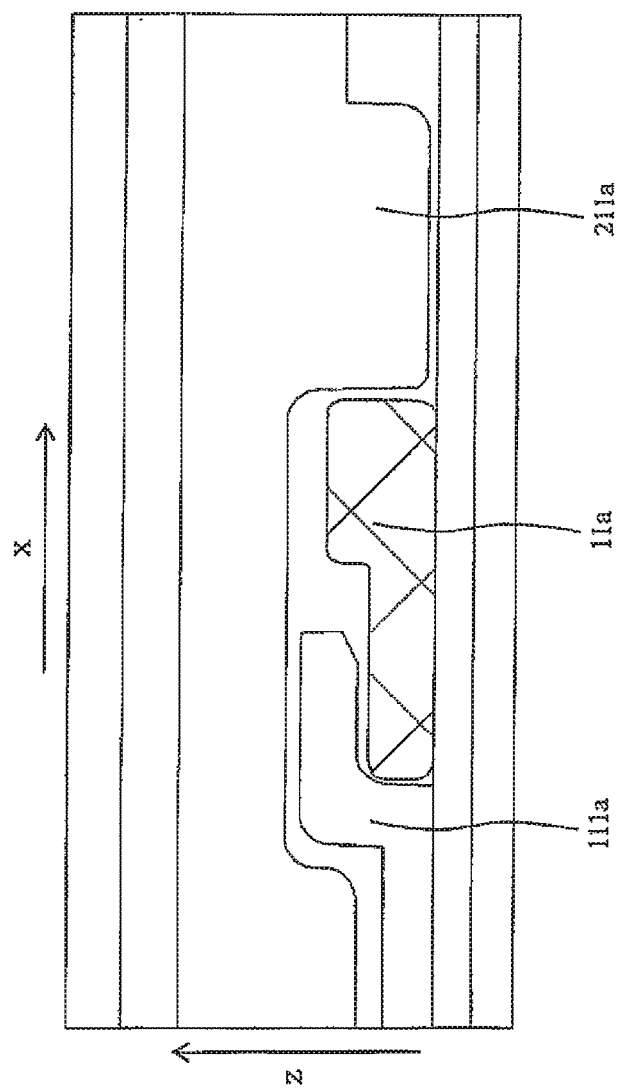
FIG. 8 is an enlarged view for illustrating a part of a cross section taken along the line Y-Y' of FIG. 7.

The housing-portion side-surface protruding portion 111a and the housing-portion side-surface protruding portion 111b are provided on one side wall of two side walls (side surfaces) of the housing portion corresponding to the x direction, and are protruding portions each having a reversed L shape protruding from the wall surfaces in the −y (minus y) direction. The housing-portion side-surface protruding portion 111a and the housing-portion side-surface protruding portion 111b are provided to positions which enable engagement with the battery-pack side-surface protruding portion 11a and the battery-pack side-surface protruding portion 11b, respectively, when the battery pack 10 is housed in the housing portion 110. Further, the housing-portion side-surface protruding portion 111a and the housing-portion side-surface protruding portion 111b have a structure which enables engagement with the battery-pack side-surface protruding portion 11a and the battery-pack side-surface protruding portion 11b, respectively. For example, as illustrated in FIG. 8, the battery-pack side-surface protruding portion 11a and the housing-portion side-surface protruding portion 111a have a structure in which a distal end of the L shape of the battery-pack side-surface protruding portion 11a enters a space defined by a rising part of the reversed L shape of the housing-portion side-surface protruding portion 111a.

Although not shown, the housing-portion side-surface protruding portion 111c and the housing-portion side-surface protruding portion 111d are provided on another side wall of the two side walls of the housing portion corresponding to the x direction, and are protruding portions each having a reversed L shape protruding from the wall surface in the +y (plus y) direction. Further, the housing-portion side-surface protruding portion 111c and the housing-portion side-surface protruding portion 111d are provided to positions which enable engagement with the battery-pack side-surface protruding portion 11c and the battery-pack side-surface protruding portion 11d, respectively, when the battery pack 10 is housed in the housing portion 110. Further, the housing-portion side-surface protruding portion 111c and the housing-portion side-surface protruding portion 111d have a structure which enables engagement with the battery-pack side-surface protruding portion 11c and the battery-pack side-surface protruding portion 11d, respectively. The number of the protruding portions provided on the side surfaces of the housing portion 110 is not particularly limited. The shape of the protruding portions is also not particularly limited. The shape only needs to be a shape capable of being engaged with the protruding portions provided on the side surfaces of the battery pack.

The housing-portion bottom-surface groove portion 112a, and the housing-portion bottom-surface groove portion 112b are grooves formed in a bottom surface of the housing portion 110. The housing-portion bottom-surface groove portion 112a and the housing-portion bottom-surface groove portion 112b are provided to positions which enable fitting of the battery-pack lower-surface protruding portion 12a and the battery-pack lower-surface protruding portion 12b, respectively, when the battery pack 10 is housed in the housing portion 110. Further, the housing-portion bottom-surface groove portion 112a and the housing-portion bottom-surface groove portion 112b have a structure which enables fitting of the battery-pack lower-surface protruding portion 12a and the battery-pack lower-surface protruding portion 12b. The housing-portion bottom-surface groove portion 112a and the housing-portion bottom-surface groove portion 112b are fitted to the battery-pack lower-surface protruding portion 12a and the battery-pack lower-surface protruding portion 12b, respectively, when the battery pack 10 is placed in the housing portion 110 (see FIG. 5). Even when the battery pack 10 is slid in a −x (minus x) direction while maintaining a fitted state to connect the connection terminals of the battery pack 10 and the connection terminals of the housing portion 110 to each other (FIG. 3), the housing-portion bottom-surface groove portion 112a and the housing-portion bottom-surface groove portion 112b keeps the fitted state. Through the fitting of the housing-portion bottom-surface groove portions (112a and 112b) of the housing portion 110 and the battery-pack lower-surface protruding portions (12a and 12b) to each other, the battery pack 10 and the housing portion 110 are positioned relative to each other. With this, a shift in relative positions of the batten-pack connection terminals 13 of the battery pack 10 and the housing-portion connection terminals 113 of the housing portion 110 is prevented.

Each of the housing-portion connection terminals 113 is formed of a connection piece or a pin, which is provided on one side wall of the two side walls (side surfaces) of the housing portion corresponding to the y direction, and has a structure which enables connection to each of the battery-pack connection terminals 13.

The housing-portion terminal positioning portion 115 is a protruding portion provided so as to be adjacent to the plurality of housing-portion connection terminals 113, and has a structure which enables fitting to the concave receiving portion of the battery-pack terminal positioning portion 15. Through fitting of the housing-portion terminal positioning portion 115 and the battery-pack terminal positioning portion 15 to each other, the battery-pack connection terminals 13 of the battery pack 10 and the housing-portion connection terminals 113 of the housing portion 110 can be connected to each other without hindrance.

The fixture 116a and the fixture 116b are turnable plate-like members, which are provided so as to be aligned on a surface of the electronic device 100 along one edge of the two edges of the housing portion 110 corresponding to the y direction. In this case, the fixture 116a and the fixture 116b are provided along the same edge as the edge to which the housing-portion connection terminals 113 are provided. Here, each of the fixtures is obtained by cutting out a part of a disc-like plate and providing a knob extending over a diameter on its upper surface.

Figure 3:
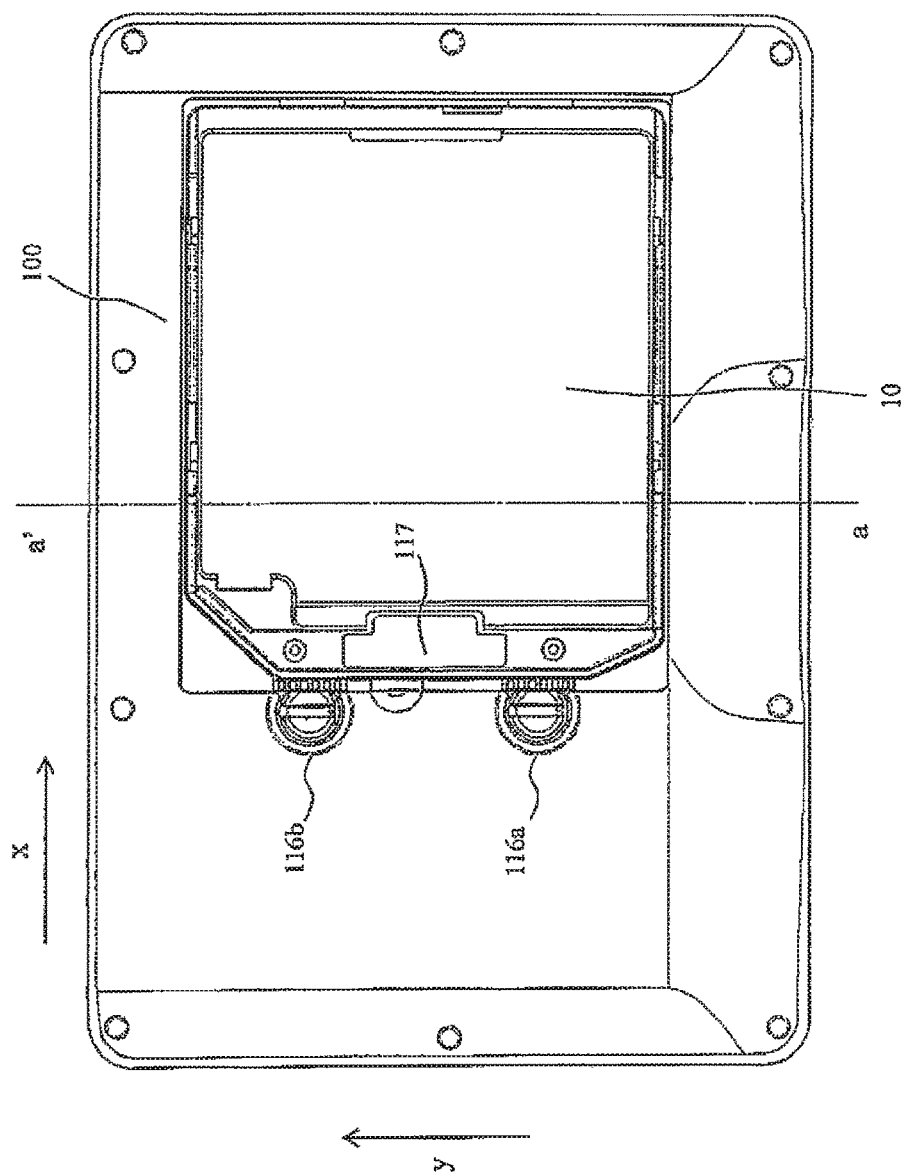
FIG. 3 is a view for illustrating a state in which the battery pack illustrated in FIG. 1 is housed in the electronic device illustrated in FIG. 2.

Here, with reference to FIG. 3, description is made of the fixture 116a and the fixture 116b. With reference to FIG. 3, there is illustrated a state in which the battery pack 10 is housed in the housing portion 110 of the electronic device 100. As illustrated in FIG. 3, the knob of each of the fixtures is adjusted to be in parallel with the y direction so that a cutout part of the disc-like plate is turned to the housing portion 110. In this manner, the battery cover 200 can be mounted to and removed from the housing portion 110 of the electronic device 100. Further, under a state in which the battery cover 200 is mounted to the housing portion 110, the knob is adjusted to be in parallel with the x direction so that a part of the disc-like plate is positioned on the battery cover 200. In this manner, the battery cover 200 can be fixed to the housing portion 110 of the electronic device 100. The above-mentioned shape of the fixture 116a and the fixture 116b is merely an example, and is not particularly limited.

The terminal protection portion 117 has an eaves-like structure covering a part above the plurality of housing-portion connection terminals 113, and is configured to protect the housing-portion connection terminals 113 from damages or the like on the housing-portion connection terminals 113 when the housing portion 110 is opened.

[1-3. Structure of Battery Cover]

Figure 4:
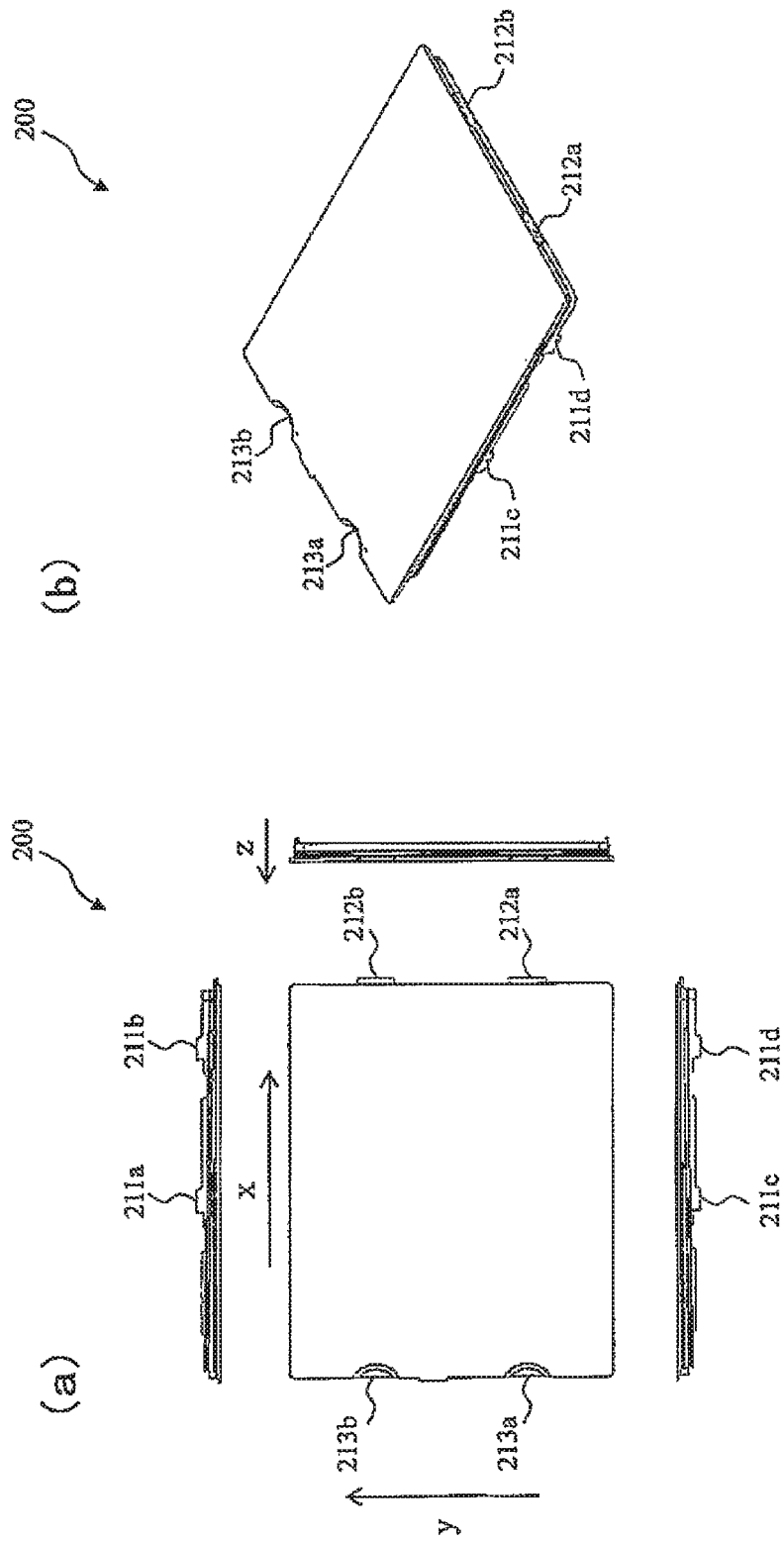
FIG. 4 includes views for illustrating a battery cover of the electronic device according to the first embodiment, in which part (a) is a view for illustrating structures of an upper surface and three side surfaces and part (b) is a perspective view for illustrating a structure of the battery cover.

Next, with reference to FIG. 4, description is made of the structure of the battery cover 200.

With reference to FIG. 4, the battery cover 200 includes four cover lower-surface protruding portions 211a to 211d, two cover side-surface protruding portions 212a and 212b, and cover side-surface stepped portions 213a and 213b.

The cover lower-surface protruding portion 211a and the cover lower-surface protruding portion 211b are provided on a lower surface of the battery cover 200 along an edge of one side surface of two side surfaces corresponding to the x direction, and are protruding portions protruding in the −z (minus z) direction. The cover lower-surface protruding portion 211a has a structure capable of being engaged with the battery-pack side-surface protruding portion 11a from the z direction, and is provided to a position which enables engagement with the battery-pack side-surface protruding portion 11a. Similarly, the cover lower-surface protruding portion 211b has a structure which enables engagement with the battery-pack side-surface protruding portion 11b from the z direction, and is provided to a position which enables engagement with the battery-pack side-surface protruding portion 11b.

The cover lower-surface protruding portion 211c and the cover lower-surface protruding portion 211d are provided on a lower surface of the battery cover 200 along an edge of another side surface of two side surfaces corresponding to the x direction, and are protruding portions protruding in the −z (minus z) direction. The cover lower-surface protruding portion 211c has a structure which enables engagement with the battery-pack side-surface protruding portion 11c from the z direction, and is provided to a position which enables engagement with the battery-pack side-surface protruding portion 11c. Similarly, the cover lower-surface protruding portion 211d has a structure which enables engagement with the battery-pack side-surface protruding portion 11d from the z direction, and is provided to a position which enables engagement with the battery-pack side-surface protruding portion 11d. The number and the shape of the protruding portions provided on the lower surface of the battery cover 200 are not particularly limited.

The cover side-surface protruding portion 212a and the cover side-surface protruding portion 212b are provided on one side surface of two side surfaces corresponding to the y direction, and are protruding portions protruding in the x direction. The battery cover 200 can be positioned through insertion of the cover side-surface protruding portion 212a and the cover side-surface protruding portion 212b into holes (not shown), which are formed in the side wall (side surface) of the housing portion 110 of the electronic device 100 corresponding to the y direction, that is, in the side wall (side surface) opposite to the plurality of housing-portion connection terminals 113.

The cover side-surface stepped portion 213a and the cover side-surface stepped portion 213b are stepped portions provided on a side surface of the battery cover 200 along an edge of another side surface of the two side surfaces corresponding to the y direction. Under a state in which the battery cover 200 is set over the housing portion 110, the knob of the fixture 116a (116b) is turned. Accordingly, the part of the disc-like plate can be placed on the cover side-surface stepped portion 213a (213b). In this manner, the cover side-surface stepped portion 213a and the cover side-surface stepped portion 213b are pressed by the fixture 116a and the fixture 116b, respectively. Thus, the battery cover 200 can be fixed to the electronic device 100.

(1-4. Method of Housing Battery Pack)

Figure 5:
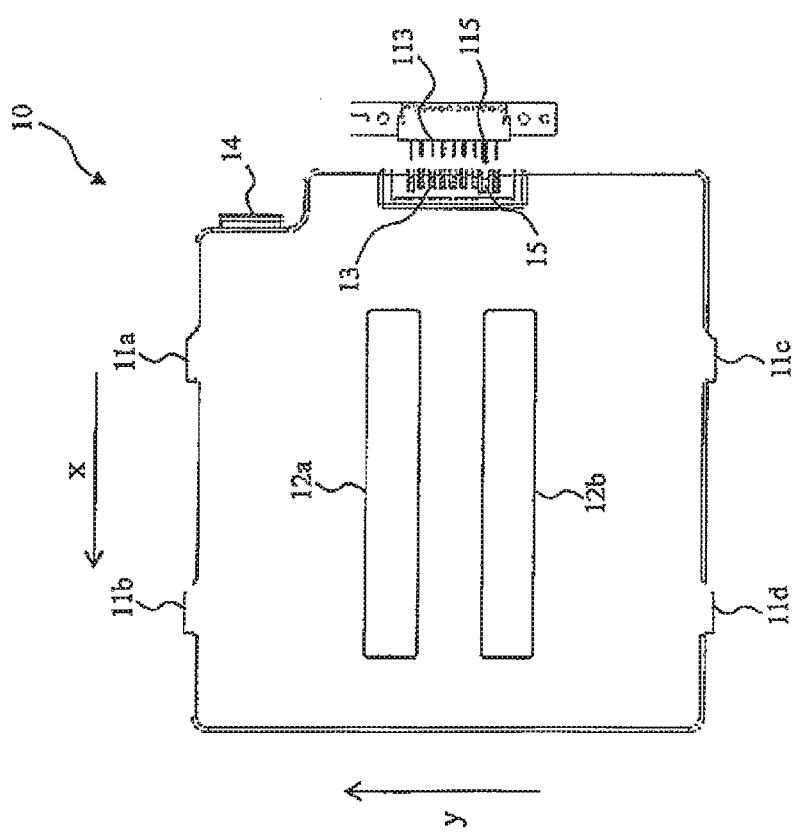
FIG. 5 is a view for illustrating a relationship between connection terminals of the battery pack and connection terminals of the housing portion of the first embodiment, in which the battery pack is illustrated with its lower surface oriented upward for easy understanding.
Figure 6:
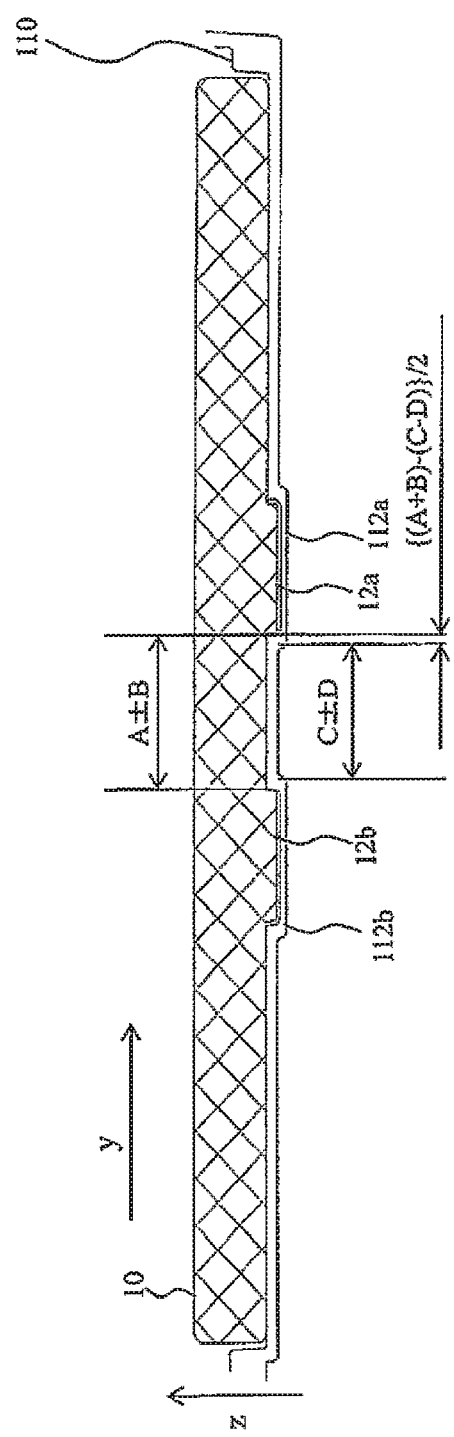
FIG. 6 is a sectional view taken along the line a-a' of FIG. 3 in a case where the battery pack of the first embodiment is housed.

Next, with reference to FIG. 2, FIG. 5, and FIG. 6, description is made of a method of housing the battery pack 10 in the housing portion 110 of the electronic device 100. FIG. 5 is a view for illustrating a structure of the lower surface of the battery pack 10 according to the first embodiment. FIG. 6 is a sectional view taken along the line a-a' of FIG. 3 in a case where the battery pack of the first embodiment is housed. In FIG. 5, for easy understanding of a relationship between the battery-pack connection terminals 13 of the battery pack 10 and the housing-portion connection terminals 113 of the housing portion, the battery pack 10 is illustrated with its lower surface oriented upward. It is needless to say that, when the battery pack 10 is housed in the housing portion, the battery pack 10 is housed with its lower surface oriented downward.

First, the battery pack 10 is brought into a state in which the battery-pack connection terminals 13 are placed slightly before the housing-portion connection terminals 113 of the housing portion 110. In this state, the battery-pack lower-surface protruding portion 12a and the battery-pack lower-surface protruding portion 12b are fitted to the housing-portion bottom-surface groove portion 112a and the housing-portion bottom-surface groove portion 112b, respectively. Subsequently, the battery pack 10 is pushed in the −x (minus x) direction. In this manner, movement of the battery pack 10 in the y direction is restricted, and the battery pack 10 is positioned in the housing portion 110. That is, in this embodiment, the battery-pack lower-surface protruding portion 12a and the battery-pack lower-surface protruding portion 12b are used for positioning of the battery pack 10, and the battery pack 10 is housed in the housing portion 110.

With reference to FIG. 6, description is made of effects of positioning of the battery pack 10 of this invention in detail. A dimension between the battery-pack lower-surface protruding portion 12a and the battery-pack lower-surface protruding portion 12b is denoted by A, and a dimensional tolerance thereof is denoted by ±B. A dimension between the housing-portion bottom-surface groove portion 112a and the housing-portion bottom-surface groove portion 112b is denoted by C, and a dimensional tolerance thereof is denoted by ±D. In this case, a gap resulting from a dimensional difference of (A+B)-(C−D) at maximum is formed. Meanwhile, in the related art, as described above, the gap resulting from the dimensional difference of (C'+D')-(A'−B') at maximum is formed. A dimensional tolerance is proportional to a magnitude of dimension. Thus, the dimensional tolerances B and D are smaller than the dimensional tolerances B' and D'. That is, even when the battery pack 10 is large in size, a gap resulting from the dimensional difference in the y direction can be reduced by housing the battery pack 10 in the housing portion 110 through use of the battery-pack lower-surface protruding portions (12a and 12b) for positioning. As a result, a shift in relative positions of the battery-pack terminal positioning portion 15 and the housing-portion terminal positioning portion 115 can be prevented, and the battery pack 10 can be housed in the housing portion 110.

Next, while keeping the state of being positioned, the battery pack 10 is moved in the −x (minus x) direction. Accordingly, the plurality of battery-pack connection terminals 13 and the plurality of housing-portion connection terminals 113 are connected to each other, and the battery-pack side-surface protruding portions 11a to 11d are engaged with the housing-portion side-surface protruding portions 111a to 111d, respectively. Specifically, the distal end of the L shape of each of the battery-pack side-surface protruding portions 11a to 11d is slid into the space defined by the rising part of the reversed L shape of each of the housing-portion side-surface protruding portions 111a to 111d of the housing portion 110. Thus, the battery-pack side-surface protruding portions 11a to 11d are engaged with the housing-portion side-surface protruding portions 111a to 111d (see FIG. 8)

Figure 7:
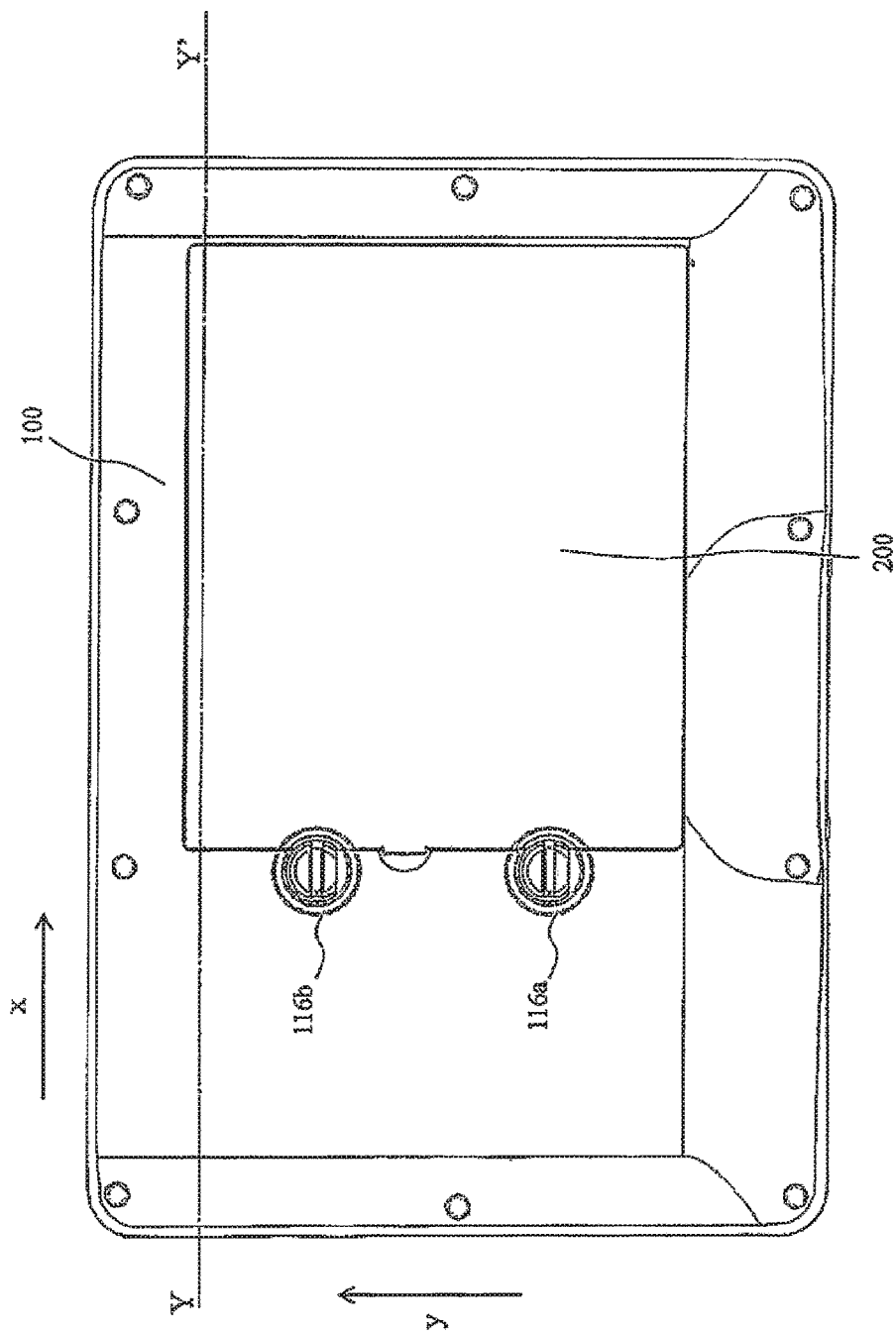
FIG. 7 is a view for illustrating a state in which the battery cover of the electronic device is closed.

Next, the battery cover 200 covers the housing portion 110 in which the battery pack 10 is housed. In order to mount the battery cover 200 to the housing portion 110, first, the cover side-surface protruding portion 212a and the cover side-surface protruding portion 212b are inserted into the holes (not shown), which are formed in the side walls of the housing portion 110. Subsequently, under a state in which the cover side-surface protruding portion 212a and the cover side-surface protruding portion 212b are inserted into the holes, the battery cover 200 covers the battery pack 10. Accordingly, the cover lower-surface protruding portions 211a to 211d are engaged with the battery-pack side-surface protruding portions 11a to 11d, respectively. Lastly, the knobs of the fixture 116a and the fixture 116b are adjusted to be in parallel with the x direction. Thus, the battery cover 200 can be mounted to the electronic device 100. In FIG. 7, there is illustrated the electronic device 100 to which the battery cover 200 is mounted.

Subsequently, description is made of a structure for keeping the battery pack 10, which is housed in the housing portion 110, so as not to be moved.

With reference to FIG. 8, description is made of a method of suppressing movement of the battery pack 10 in the x direction and the z direction. FIG. 8 is an enlarged view of a part of a cross section taken along the line Y-Y' of FIG. 7.

First, description is made of a method of restricting movement of the battery pack 10 in the x direction.

With reference to FIG. 8, as described above, the distal end of the L shape of the battery-pack side-surface protruding portion 11a enters the space defined by the rising part of the reverse L shape of the housing-portion side-surface protruding portion 111a. Accordingly, the housing-portion side-surface protruding portion 111a restricts movement of the battery-pack side-surface protruding portion 11a in the −x (minus x) direction. Further, the battery-pack side-surface protruding portion 11a is engaged with the cover lower-surface protruding portion 211a from the z direction, thereby restricting movement in the x direction. That is, movement of the battery-pack side-surface protruding portion 11a in both the x direction and the −x (minus x) direction is restricted by the housing-portion side-surface protruding portion 111a and the cover lower-surface protruding portion 211a. The same holds true for the battery-pack side-surface protruding portions 11b to 11d. Thus, movement of the battery pack 10 in the x direction is restricted.

Next, description is made of a method of restricting movement of the battery pack 10 in the z direction.

As described above, the distal end of the L shape of the battery-pack side-surface protruding portion 11a enters the space defined by the rising part of the reversed L shape of the housing-portion side-surface protruding portion 111a. Thus, the housing-portion side-surface protruding portion 111a restricts movement of the battery-pack side-surface protruding portion 11a in the z direction. The same holds true for the battery-pack side-surface protruding portions 11b to 11d. Therefore, movement of the battery pack 10 in the z direction is restricted.

In the above-mentioned state, movement of the battery pack 10 in the y direction is restricted through fitting of the housing-portion bottom-surface groove portions (112a and 112b) of the housing portion 110 to the battery-pack lower-surface protruding portions (12a and 12b).

Movement of the battery pack 10 in the x direction, the y direction, and the z direction is restricted. Thus, the battery pack 10 is prevented from moving in the housing portion 110 due to a shock or the like, thereby being capable of preventing damage on the battery-pack connection terminals 13 and the housing-portion connection terminals 113. In the related art, movement of the battery pack in the housing portion is restricted through use of a protection member such as a cushion. However, a retention force exerted by the protection member becomes weaker as time elapses. Accordingly, there is a fear in that, when the protection member is used for a long period of time, connection between the plurality of connection terminals provided to the battery pack and the plurality of connection terminals provided to the housing portion may be cut. Meanwhile, in this embodiment, the protruding portions provided to the battery pack 10 and the protruding portions provided to the housing portion 110 are engaged with each other. Accordingly, movement of the battery pack 10 in the x direction, the y direction, and the z direction is restricted. Therefore, according to this invention, the protection member which is used in the related art is not required. A retention force, which is exerted by the protruding portions provided to the battery pack 10 and the protruding portions provided to the housing portion 110, does not become weaker as time elapses, unlike the protection member. Thus, this invention enables use for a long period of time, and is excellent in terms of cost.

Figure 9:
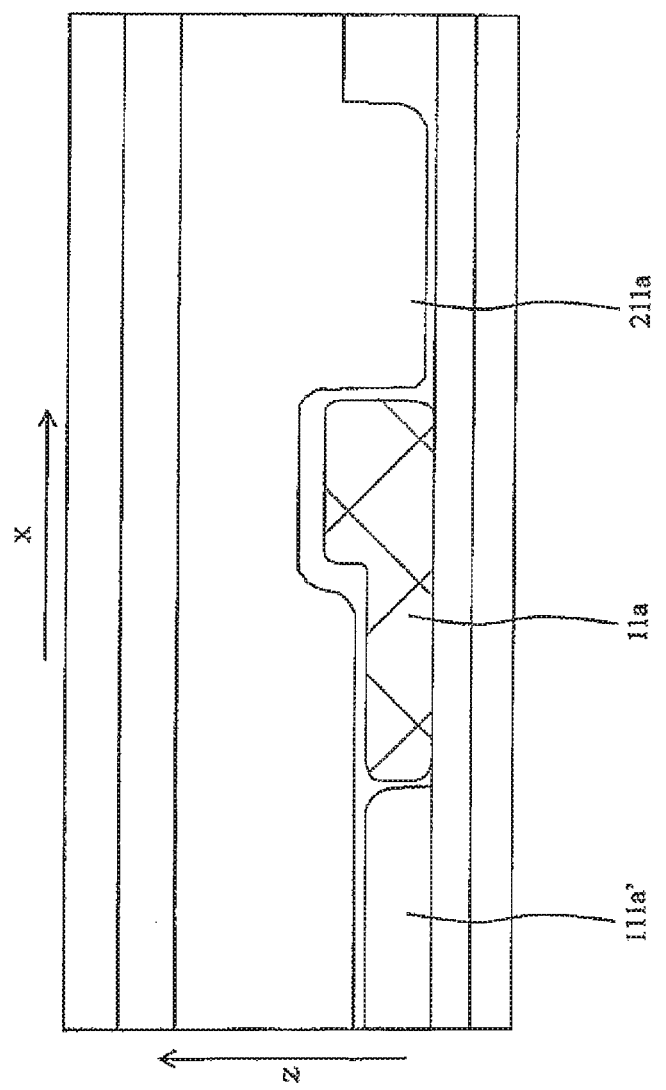
FIG. 9 is a sectional view for illustrating a modification example of FIG. 8.

The shape of each of the protruding portions provided on the side surfaces of the housing portion 110 is not particularly limited, and may have a structure illustrated in, for example, FIG. 9. The housing-portion side-surface protruding portion 111a' illustrated in FIG. 9 is a modification example of the housing-portion side-surface protruding portion 111a. As illustrated in FIG. 9, when each of the protruding portions is a flat type similarly to the housing-portion side-surface protruding portion 111a', movement of the battery-pack side-surface protruding portion 11a in the −x (minus x) direction can be restricted. In this case, movement of the battery-pack side-surface protruding portion 11a in the z direction is restricted by a part of the battery cover 200, which is adjacent to the cover lower-surface protruding portion 211a. The same holds true for the housing-portion side-surface protruding portions 111b' to 111d' (not shown).

2. Second Embodiment

Figure 10:
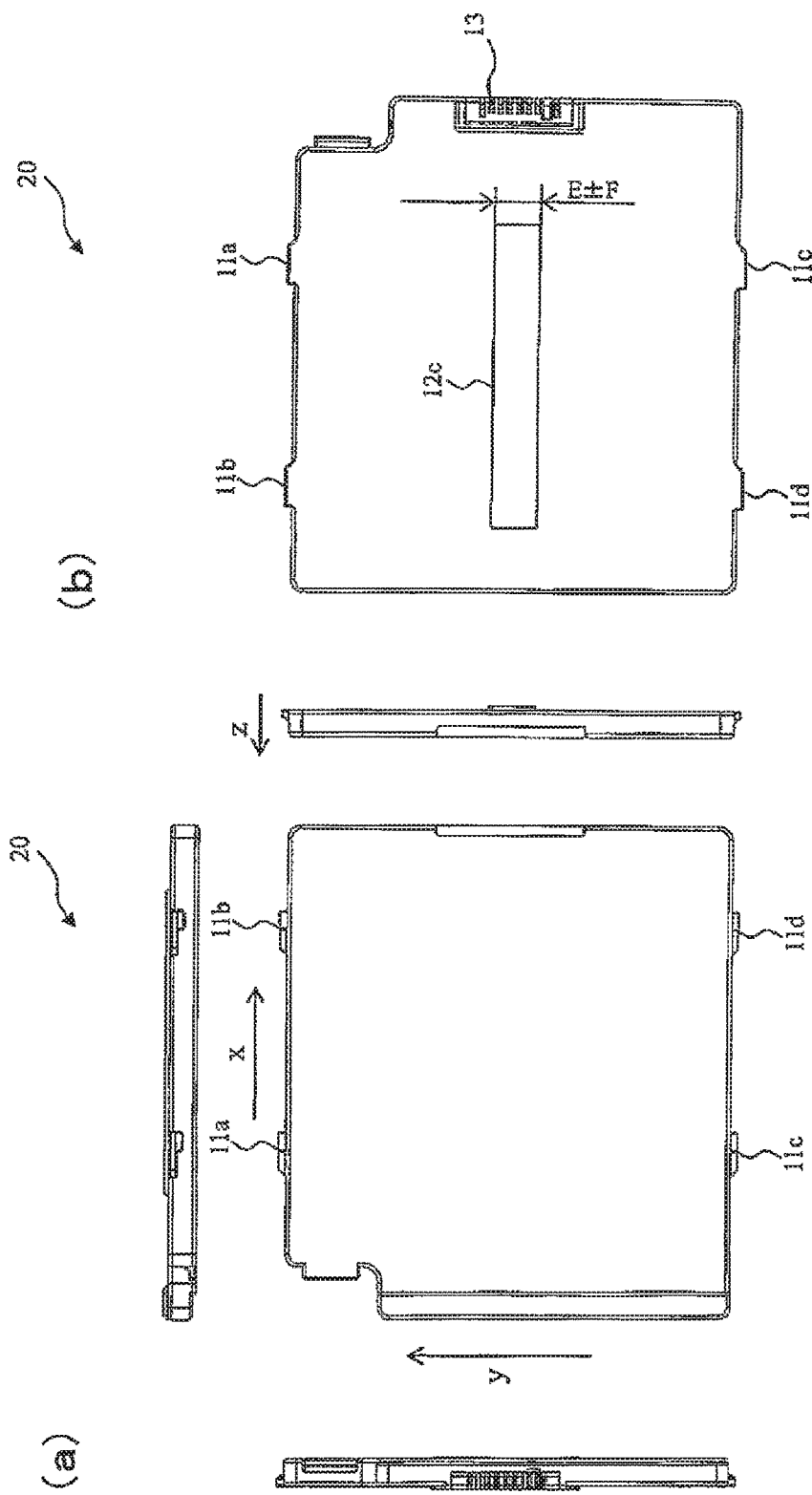
FIG. 10 includes views for illustrating a battery pack according to a second embodiment of this invention, in which part (a) is a view for illustrating structures of an upper surface and three side surfaces and part (b) is a view for illustrating a structure of a lower surface.
Figure 11:
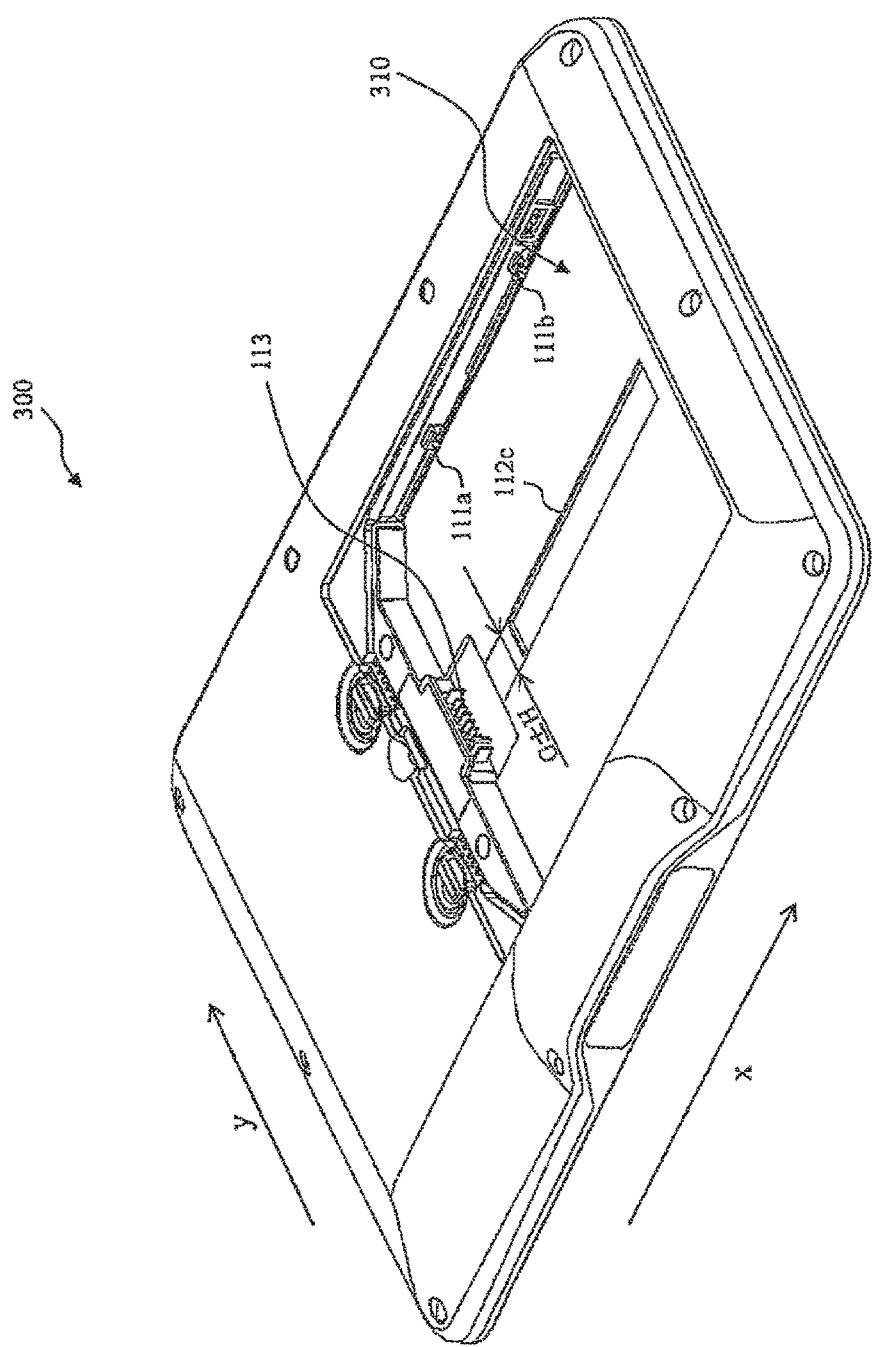
FIG. 11 is a perspective view for illustrating a structure of a housing portion for the battery pack of an electronic device according to the second embodiment.
Figure 12:
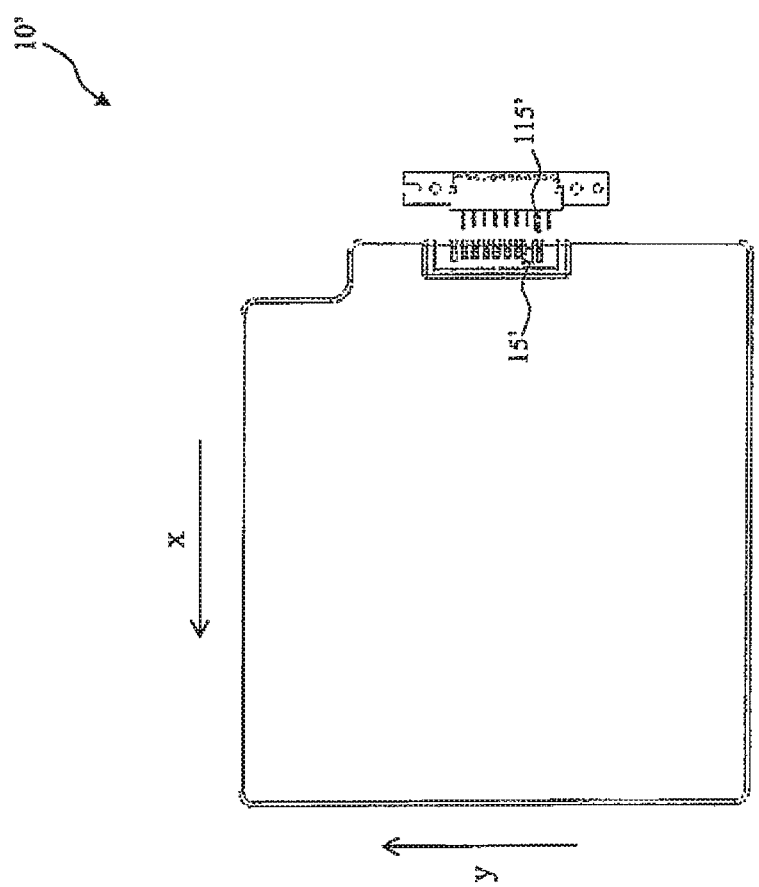
FIG. 12 is a view for illustrating terminals of a battery pack and terminals of a housing portion of an electronic device according to a related art.
Figure 13:
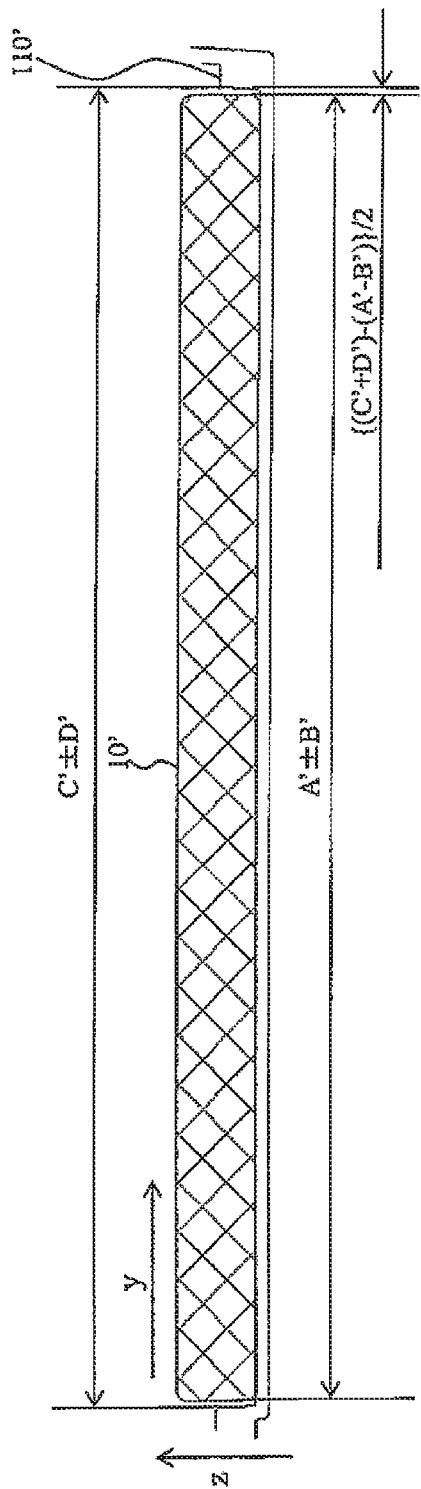
FIG. 13 is a sectional view of the electronic device, in which the battery pack according to the related art is housed.

Next, with reference to FIG. 10 and FIG. 11, description is made of structures of a battery pack 20 and a housing portion 310 of an electronic device 300 according to a second embodiment of this invention.

FIG. 10(a) is a view for illustrating structures of an upper surface and three side surfaces of the battery pack 20. FIG. 10(b) is a view for illustrating a structure of a lower surface of the battery pack 20.

With reference to FIG. 10(a) and FIG. 10(b), only a battery-pack lower-surface protruding portion 12c is provided to the lower surface of the battery pack 20. With reference to FIG. 11, only a housing-portion bottom-surface groove portion 112c is provided in a bottom surface of a housing portion 310.

As in this invention, when the battery-pack lower-surface protruding portion 12c is used for positioning, and the battery pack 20 is housed in the housing portion 310, the shift in relative positions of the battery-pack connection terminals 13 and the housing-portion connection terminals 113 can be prevented. Specifically, for example, a dimension of the battery-pack lower-surface protruding portion 12c in they direction is denoted by E, and a dimensional tolerance thereof is denoted by ±F. A dimension of the housing-portion bottom-surface groove portion 112c in the y direction is denoted by G, and a dimensional tolerance thereof is denoted by ±H. In this case, in the battery pack 20, a gap resulting from a dimensional difference of (G+)-(E−F) at maximum is formed in the y direction. Meanwhile, as described above, the maximum gap resulting from the dimensional difference generated in the related art is (C'+ D')-(A'−B') at maximum. That is, even in the case of the battery pack 20, the dimensional tolerances are smaller than those in the related art. Thus, when the battery-pack lower-surface protruding portion 12c is used for positioning, and the battery pack 20 is housed in the housing portion 310, the shift in relative positions of the battery-pack connection terminals 13 of the battery pack 20 and the housing-portion connection terminals 113 of the housing portion 310 can be prevented.

This application claims priority from Japanese Patent Application No. 2014-231331, filed on Nov. 14, 2014, the entire disclosure of which is incorporated herein by reference.

REFERENCE SIGNS LIST

10 . . . battery pack
10' . . . battery pack
11a, 11b, 11c, 11d . . . battery-pack side-surface protruding portion
12a, 12b, 12c . . . battery-pack lower-surface protruding portion
13 . . . battery-pack connection terminal
14 . . . battery-pack claw portion
15 . . . battery-pack terminal positioning portion
15' . . . battery-pack terminal positioning portion
20 . . . battery pack
100 . . . electronic device
110 . . . housing portion
110' . . . housing portion
111a, 111b, 111c, 111d . . . housing-portion side-surface protruding portion
11a . . . housing-portion side-surface protruding portion
112a, 112b, 112c . . . housing-portion bottom-surface groove portion
113 . . . housing-portion connection terminal
115 . . . housing-portion terminal positioning portion
115' . . . housing-portion terminal positioning portion
116a, 116b . . . fixture
117 . . . terminal protection portion
200 . . . battery cover
211a, 211b, 211c, 211d . . . cover lower-surface protruding portion
212a, 212b . . . cover side-surface protruding portion
213a, 213b . . . cover side-surface stepped portion
300 . . . electronic device
310 . . . housing portion

The invention claimed is:

1. A battery pack housing structure, which is used for an electronic device including a housing portion for housing a battery pack, comprising:
a battery cover for covering the housing portion in which the battery pack is housed;
the battery pack having a substantially quadrangular shape with a flat plat shape, and comprising connection terminals provided on a first side surface, battery-pack side-surface protruding portions provided on a second side surface and a third side surface, which are adjacent to the first side surface, and a battery-pack lower-surface protruding portion protruding from a lower surface of the battery pack; and
the housing portion comprising housing-portion connection terminals provided on a first housing-portion side-surface which is a side surface corresponding to the first side surface, housing-portion side-surface protruding portions provided on a second housing-portion side-surface which is a side surface corresponding to the second side surface and a third housing-portion side-surface which is a side surface corresponding to the third side surface, and capable of being engaged with the battery-pack side-surface protruding portion, and a housing-portion bottom-surface groove portion, which is formed in a bottom surface of the housing portion corresponding to the lower surface of the battery pack and capable of being fitted to the battery-pack lower-surface protruding portion, wherein the battery cover comprises cover lower-surface protruding portions provided on a lower surface of the battery cover edge corresponding to the second housing-portion side-surface and the lower surface of the battery cover edge corresponding to the third housing-portion side-surface, wherein, when the battery-pack lower-surface protruding portion and the housing-portion bottom-surface groove portion are fitted to each other, relative positions of connection terminals of the battery pack and the connection terminals of the housing portion are set, wherein the relative positions are positions in a terminal connection direction in which the connection terminals of the battery pack and the connection terminals of the housing portion are connected to each other, wherein, when the battery-pack side-surface protruding portions, the housing-portion side-surface protruding portions, and the cover lower-surface protruding portions are engaged together, movement of the battery pack in the terminal connection direction and in a direction from the lower surface of the battery pack toward a upper-surface of the battery pack is restricted, and wherein, when the battery pack lower-surface protruding portion and the housing-portion bottom-surface groove portion are fitted to each other, movement of a direction along the bottom surface of the housing portion and in a direction perpendicular to the connection direction of the battery pack connection terminals is restricted.

2. A battery pack housing structure according to claim 1, wherein at least one of the battery-pack side-surface protruding portions, at least one of the housing-portion side-surface protruding portions, and at least one of the cover lower-surface protruding portions are provided on the second side surface and the third side surface which are two side surfaces of the battery pack, the second housing-portion side-surface and the third housing-portion side-surface which are two side surfaces of the housing portion, and the lower surface of the battery cover edge corresponding to the second housing-portion side-surface and the lower surface of the battery cover edge corresponding to the third housing-portion side-surface, which are two side lower surfaces of the battery cover edges, respectively.

3. A battery pack housing structure according to claim 1, wherein the battery-pack lower-surface protruding portion has a cross section of any shape among a quadrangle, a triangle, and a semicircle.

4. An electronic device, which includes a housing portion for housing a battery pack, comprising:
a battery cover for covering the housing portion in which the battery pack is housed;
the battery pack having a substantially quadrangular shape with a flat plat shape, and comprising connection terminals provided on a first side surface, battery-pack side-surface protruding portions provided on a second side surface and a third side surface, which are adjacent to the first side surface, and a battery-pack lower-surface protruding portion protruding from a lower surface of the battery pack; and
the housing portion comprising housing-portion connection terminals provided on a first housing-portion side-surface which is a side surface corresponding to the first side surface, housing-portion side-surface protruding portions provided on a second housing-portion side-surface which is a side surface corresponding to the second side surface and a third housing-portion side-surface which is a side surface corresponding to the third side surface, and capable of being engaged with the battery-pack side-surface protruding portion, and a housing-portion bottom-surface groove portion, which is formed in a bottom surface of the housing portion corresponding to the lower surface of the battery pack and capable of being fitted to the battery-pack lower-surface protruding portion, wherein the battery cover comprises cover lower-surface protruding portions provided on a lower surface of the battery cover edge corresponding to the second housing-portion side-surface and the lower surface of the battery cover edge corresponding to the third housing-portion side-surface, wherein, when the battery-pack lower-surface protruding portion and the housing-portion bottom-surface groove portion are fitted to each other, relative positions of the connection terminals of the battery pack and connection terminals of the housing portion are set, wherein the relative positions are positions in a terminal connection direction in which the connection terminals of the battery pack and the connection terminals of the housing portion are connected to each other, wherein, when the battery-pack side-surface protruding portions, the housing-portion side-surface protruding portions, and the cover lower-surface protruding portions are engaged together, movement of the battery pack in the terminal connection direction and in a direction from the lower surface of the battery pack toward a upper-surface of the battery pack is restricted, and wherein, when the battery pack lower-surface protruding portion and the housing-portion bottom-surface groove portion are fitted to each other, movement of a direction along the bottom surface of the housing portion and in a direction perpendicular to the connection direction of the battery pack connection terminals is restricted.

5. An electronic device according to claim 4, wherein at least one of the battery-pack side-surface protruding portions, at least one of the housing-portion side-surface protruding portions, and at least one of the cover lower-surface protruding portions are provided on the second side surface and the third side surface which are two side surfaces of the battery pack, the second housing-portion side-surface and the third housing-portion side-surface which are two side surfaces of the housing portion, and the lower surface of the battery cover edge corresponding to the second housing-portion side-surface and the lower surface of the battery cover edge corresponding to the third housing-portion side-surface, which are two lower surfaces of the battery cover edges, respectively.

6. An electronic device according to claim 4, wherein the battery-pack lower-surface protruding portion has a cross section of any shape among a quadrangle, a triangle, and a semicircle.

* * * * *

UNITED STATES PATENT AND TRADEMARK OFFICE
CERTIFICATE OF CORRECTION

| | |
|---|---|
| PATENT NO. | : 10,014,499 B2 |
| APPLICATION NO. | : 15/524027 |
| DATED | : July 3, 2018 |
| INVENTOR(S) | : Yohei Ikegami, Akihisa Iwata and Takeshi Komatsu |

It is certified that error appears in the above-identified patent and that said Letters Patent is hereby corrected as shown below:

In the Specification

Column 2, Disclosure of the Invention, Line 1; Delete "they" and insert --the y-- therefor Column 2, Disclosure of the Invention, Line 5; Delete "they" and insert --the y-- therefor Column 2, Disclosure of the Invention, Line 61; Delete "pack," and insert --pack;-- therefor Column 3, Line 62; Delete "MODE" and insert --MODES-- therefor Column 6, Mode for Embodying the Invention, Line 29; Delete "112a," and insert --112a-- therefor Column 6, Mode for Embodying the Invention, Line 61; Delete "batten-pack" and insert --battery-pack-- therefor Column 7, Mode for Embodying the Invention, Line 30; Delete "they" and insert --the y-- therefor Column 9, Mode for Embodying the Invention, Line 53; Delete "8)" and insert --8).-- therefor Column 10, Mode for Embodying the Invention, Line 50; Delete "they" and insert --the y-- therefor Column 11, Mode for Embodying the Invention, Line 53; Delete "they" and insert --the y-- therefor Column 11, Mode for Embodying the Invention, Line 58; Delete "(G+)-(E-F)" and insert --(G+H)-(E-F)-- therefor Column 12, Reference Signs List, Line 27; Delete "11a" and insert --111a'-- therefor Signed and Sealed this
Nineteenth Day of February, 2019

Andrei Iancu
*Director of the United States Patent and Trademark Office*